United States Patent
Ezaki et al.

(10) Patent No.: US 9,730,190 B2
(45) Date of Patent: Aug. 8, 2017

(54) TERMINAL APPARATUS, COMMUNICATION SYSTEM, AND COMMUNICATION METHOD

(75) Inventors: Takato Ezaki, Kawasaki (JP); Tsuyoshi Shimomura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 121 days.

(21) Appl. No.: 13/341,083

(22) Filed: Dec. 30, 2011

(65) Prior Publication Data

US 2012/0099458 A1  Apr. 26, 2012

Related U.S. Application Data

(63) Continuation of application No. PCT/JP2009/062998, filed on Jul. 17, 2009.

(51) Int. Cl.
*H04W 72/04* (2009.01)
*H04W 88/02* (2009.01)

(52) U.S. Cl.
CPC .... *H04W 72/0406* (2013.01); *H04W 72/0426* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 5,548,806 A | 8/1996 | Yamaguchi et al. | |
| 7,463,616 B1 * | 12/2008 | Earnshaw | H04W 72/1231 370/337 |
| 7,577,437 B1 * | 8/2009 | Friman | H04W 28/18 370/329 |
| 8,254,369 B2 * | 8/2012 | Ono | 370/350 |
| 2002/0055360 A1 * | 5/2002 | Chen | H04W 16/00 455/452.2 |
| 2002/0082021 A1 * | 6/2002 | Chen et al. | 455/450 |
| 2002/0105932 A1 | 8/2002 | Miya | |
| 2004/0092232 A1 * | 5/2004 | Zeira et al. | 455/67.11 |
| 2005/0073971 A1 | 4/2005 | Mukai | |
| 2005/0130662 A1 | 6/2005 | Murai | |

(Continued)

FOREIGN PATENT DOCUMENTS

| | | |
|---|---|---|
| CN | 1921337 | 2/2007 |
| CN | 101330305 | 12/2008 |

(Continued)

OTHER PUBLICATIONS

Morimoto et al, "Investigation on Optimum Radio Link Connection Using Remote Radio Equipment in Heterogeneous Network for LTE-Advanced", Vehicular Technology Conference, 2009. VTC Spring 2009. IEEE 69$^{th}$, All.*

(Continued)

*Primary Examiner* — Bao G Nguyen
(74) *Attorney, Agent, or Firm* — Myers Wolin, LLC

(57) ABSTRACT

A terminal apparatus includes a downlink transceiver that receives downlink data via a base station governing a first cell and exchanges with the base station governing the first cell, control information that is for receiving the downlink data; and an uplink transceiver that transmits uplink data via a base station governing a second cell that is different from the first cell and exchanges with the base station governing the second cell, control information that is for transmitting the uplink data.

9 Claims, 17 Drawing Sheets

(56) References Cited

U.S. PATENT DOCUMENTS

| | | | |
|---|---|---|---|
| 2006/0034239 A1 | 2/2006 | Abeta et al. | |
| 2007/0115878 A1 | 5/2007 | Ashish et al. | |
| 2007/0253355 A1* | 11/2007 | Hande | H04W 16/06 370/328 |
| 2008/0089359 A1* | 4/2008 | Yang | H04W 72/0406 370/469 |
| 2008/0318614 A1 | 12/2008 | Iizuka et al. | |
| 2009/0124261 A1* | 5/2009 | Shimomura | 455/436 |
| 2009/0161627 A1* | 6/2009 | Ekambaram et al. | 370/331 |
| 2009/0196249 A1 | 8/2009 | Kawamura et al. | |
| 2009/0245190 A1 | 10/2009 | Higuchi et al. | |
| 2010/0040037 A1* | 2/2010 | Choi | H04W 36/0088 370/345 |
| 2010/0040040 A1* | 2/2010 | Tran et al. | 370/347 |
| 2010/0099453 A1 | 4/2010 | Usuda et al. | |
| 2010/0172291 A1* | 7/2010 | Kim et al. | 370/328 |
| 2011/0032907 A1* | 2/2011 | Sahara | H04L 5/0044 370/331 |

FOREIGN PATENT DOCUMENTS

| | | |
|---|---|---|
| EP | 2 056 616 | 5/2009 |
| EP | 2 315 477 A1 | 4/2011 |
| JP | 06-224828 | 8/1994 |
| JP | 07-030527 | 1/1995 |
| JP | 10-336751 | 12/1998 |
| JP | 2001-339770 | 12/2001 |
| JP | 2002-204470 | 7/2002 |
| JP | 2003-169373 | 6/2003 |
| JP | 2005-110014 | 4/2005 |
| JP | 2006-054597 | 2/2006 |
| JP | 2007-514367 | 5/2007 |
| JP | 2008-053864 | 3/2008 |
| KR | 10-2007-0048555 | 5/2007 |
| KR | 10-2009-0021290 | 3/2009 |
| WO | 2008/023644 | 2/2008 |
| WO | 2010/035945 A1 | 4/2010 |

OTHER PUBLICATIONS

Morimoto et al, "Investigation on Optimum Radio Link Connection Using Remote Radio Equipment in Heterogeneous Network for LTE-Advanced", Vehicular Technology Conference, 2009. VTC Spring 2009. IEEE 69th, All.*
International preliminary report on patentability issued for corresponding Japanese Patent Application No. PCT/JP2009/062998 mailed Feb. 16, 2012 with English translation.
Akihito Morimoto et al.; "Downlink/Uplink Radio Link Connection Methods in Heterogeneous Network for LTE-Advanced"; dated Sep. 16, 2008. Partial English translation attached.
International Search Report issued for corresponding International Patent Application No. PCT/JP2009/062998, mailed Sep. 29, 2009. English translation attached.
Notice of Rejection issued for corresponding Japanese Patent Application No. 2011-522673, mailed Jun. 25, 2013, with full English translation.
First Notification of Office Action issued for corresponding Chinese Patent Application No. 200980160456.1, issued Jan. 6, 2014, with a partial English translation.
Notice of Preliminary Rejection issued by the Korean Intellectual Property Office for corresponding Korean Patent Application No. 10-2012-7000407, mailed Sep. 17, 2013, with English translation.
Third Office Action issued for corresponding Chinese Patent Application No. 200980160456.1 dated Jan. 29, 2015 with an English translation.
Forth (4th) Notification of Office Action issued for corresponding Chinese Patent Application No. 200980160456.1 dated Aug. 5, 2015 with a partial English translation.
NTT Docomo, Inc., "Inter-cell Radio Resource Management for Heterogeneous Networks", Agenda Item: 15.2, 3GPP TSG RAN WG1 Meeting #57bis, R1-092800, Los Angeles, USA, Jun. 29-Jul. 3, 2009, pp. 1-36.
Extended European search report with supplementary European search report and the European search opinion issued by the European Patent Office for corresponding European Patent Application No. 09847349.9, dated May 26, 2017.

* cited by examiner

TERMINAL APPARATUS, COMMUNICATION SYSTEM, AND COMMUNICATION METHOD

CROSS REFERENCE TO THE RELATED APPLICATIONS

This application is a continuation application of International Application PCT/JP2009/062998, filed Jul. 17, 2009, and designating the U.S., the entire contents of which are incorporated herein by reference.

FIELD

The embodiments discussed herein are related to a terminal apparatus, communication system, and communication method that perform wireless communication.

BACKGROUND

Recently, for wireless communication systems, schemes are being investigated to eliminate dead zones, expand cell coverage, increase average reception strength, and improve throughput by arranging small-scale cells, such as microcells and picocells. Generally, mobile stations measure the strength of signals transmitted from base stations and implement control to connect to a cell having greater reception strength.

Consequently, when transmission strengths and cell sizes are respectively identical for all base stations, by control above, a mobile station selects an optimal cell for communication with respect to the uplink and downlink. An optimal cell is, for example, a cell for which the reception strength at the mobile station is greatest for the downlink and the reception strength at the base station is greatest for the uplink.

On the other hand, in communication systems where the cell sizes and transmission strengths differ among base stations, at a position between a large cell and a small cell, the cell for which the uplink reception strength is greatest and the cell for which the downlink reception strength is greatest may differ. This is consequent to the downlink reception strength measured at the mobile station being dependent on 2 factors, the transmission strength of each base station and downlink propagation loss, whereas the uplink reception strength measured at the base station is dependent on uplink propagation loss.

For example, at the mobile station, downlink reception strength is greater for larger cells, which have greater transmission strength; and at the base station, the reception strength of signals from mobile stations is greater for smaller cells since mobile stations are closer in distance and suffer less propagation loss. Under such circumstances, conventionally, when a cell for a mobile station is determined according to the reception strength of signals from base stations, the downlink reception quality improves, but conversely, the uplink reception quality diminishes.

To address this problem, technology has been disclosed in which the base station and the mobile station have a function of performing communication with different cells for the uplink and downlink (see, for example, Published Japanese-Translation of PCT Application, Publication No. 2007-514367; Japanese Laid-Open Patent Publication No. H6-224828; and MORIMOTO, Akihito; TANNO, Motohiro; KISHIYAMA, Yoshihisa; MIKI, Nobuhiko; TAOKA, Hidekazu; HIGUCHI, Kenichi; and SAWAHASHI, Mamoru, "Downlink/Uplink Radio Link Connection Methods in Heterogeneous Network for LTE-Advanced", 2008 IEICE Conference, Sep. 16, 2008, p. 327). For example, for the downlink, communication is performed with a cell having greater reception strength at the mobile station and for the uplink, communication is performed with a cell having less propagation loss and greater reception strength at the base station.

However, with the conventional technologies above, by making uplink and downlink connections with different cells, control information overhead increases, triggering deterioration of communication efficiency. For example, in various types of wireless communication schemes such as Wideband Code Division Multiple Access (W-CDMA) and Long Term Evolution (LTE), a large part of the control information exchanged between the mobile station and the base station is for wireless interval control.

This control information includes, for example, feedback information for acknowledgment of transmitted data and notification of wireless resource allocation. In the uplink and the downlink, if communication is limited to one direction, since the control information is forwarded by a physical communication line between base stations, the scheduling process at each of the base stations becomes complicated. For example, when control information is forwarded among the base stations, the scheduling process at each base station is difficult to perform independently for each base station. Further, delays in the scheduling process occur consequent to the forwarding of control information.

SUMMARY

According to an aspect of an embodiment, a terminal apparatus includes a downlink transceiver that receives downlink data via a base station governing a first cell and exchanges with the base station governing the first cell, control information that is for receiving the downlink data; and an uplink transceiver that transmits uplink data via a base station governing a second cell that is different from the first cell and exchanges with the base station governing the second cell, control information that is for transmitting the uplink data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to the accompanying drawings.

Figure 1:
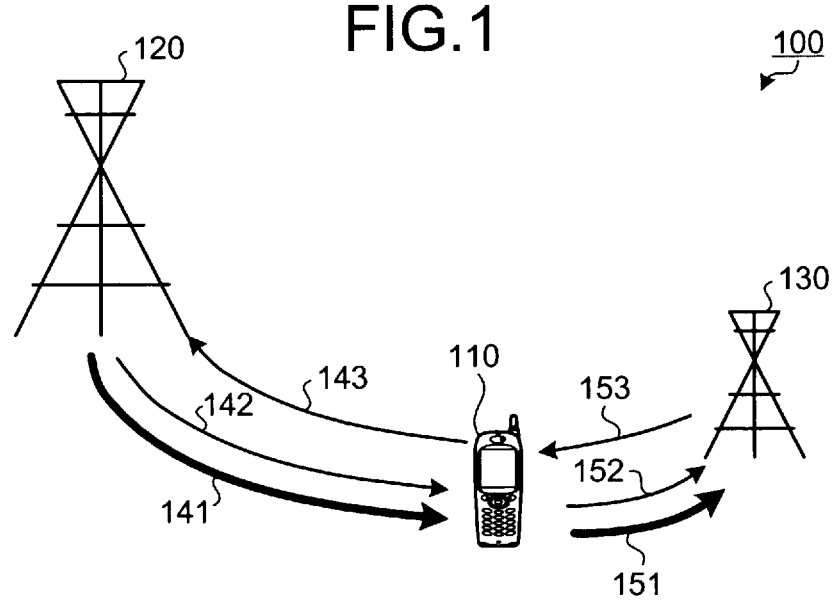
FIG. 1 is a diagram of a communication system according to a first embodiment.

FIG. 1 is a diagram of the communication system according to the first embodiment. As depicted in FIG. 1, a communication system 100 according to the first embodiment includes a terminal apparatus 110, a first base station 120, and a second base station 130. The terminal apparatus 110, for example, is a mobile station capable of wireless communication, such as a mobile telephone. The communication scheme of the terminal apparatus 110, for example, is a full duplex that concurrently performs uplink and downlink communication. The first base station 120 governs a first cell and the second base station 130 governs a second cell that is different from the first cell.

The terminal apparatus 110 selects a base station for the uplink and the downlink, respectively, and communicates with a network via the selected base station. For example, the terminal apparatus 110 communicates with a network via one base station (e.g., the first base station 120) for both the uplink and the downlink. Further, according to the communication environment, the terminal apparatus 110 may communicate with the network by an uplink and a downlink through different base stations.

Here, circumstances when the terminal apparatus 110 communicates with the network by a downlink through the first base station 120 and communicates with the network by an uplink through the second base station 130 will be described.

The terminal apparatus 110 receives downlink data 141 from the first base station 120 through the downlink. Further, the terminal apparatus 110 exchanges control information with the first base station 120. The control information is for reception of the downlink data 141. For example, the terminal apparatus 110 receives from the first base station 120, downlink control information 142 for reception of the downlink data 141 and transmits to the first base station 120, uplink control information 143 for transmission of the downlink data 141.

The terminal apparatus 110 transmits uplink data 151 to the second base station 130 through the uplink. Further, the terminal apparatus 110 exchanges control information with the second base station 130. The control information is for transmission of the uplink data 151. For example, the terminal apparatus 110 transmits to the second base station 130, uplink control information 152 for transmission of the uplink data 151 and receives from the second base station 130, downlink control information 153 for transmission of the uplink data 151.

Figure 2:
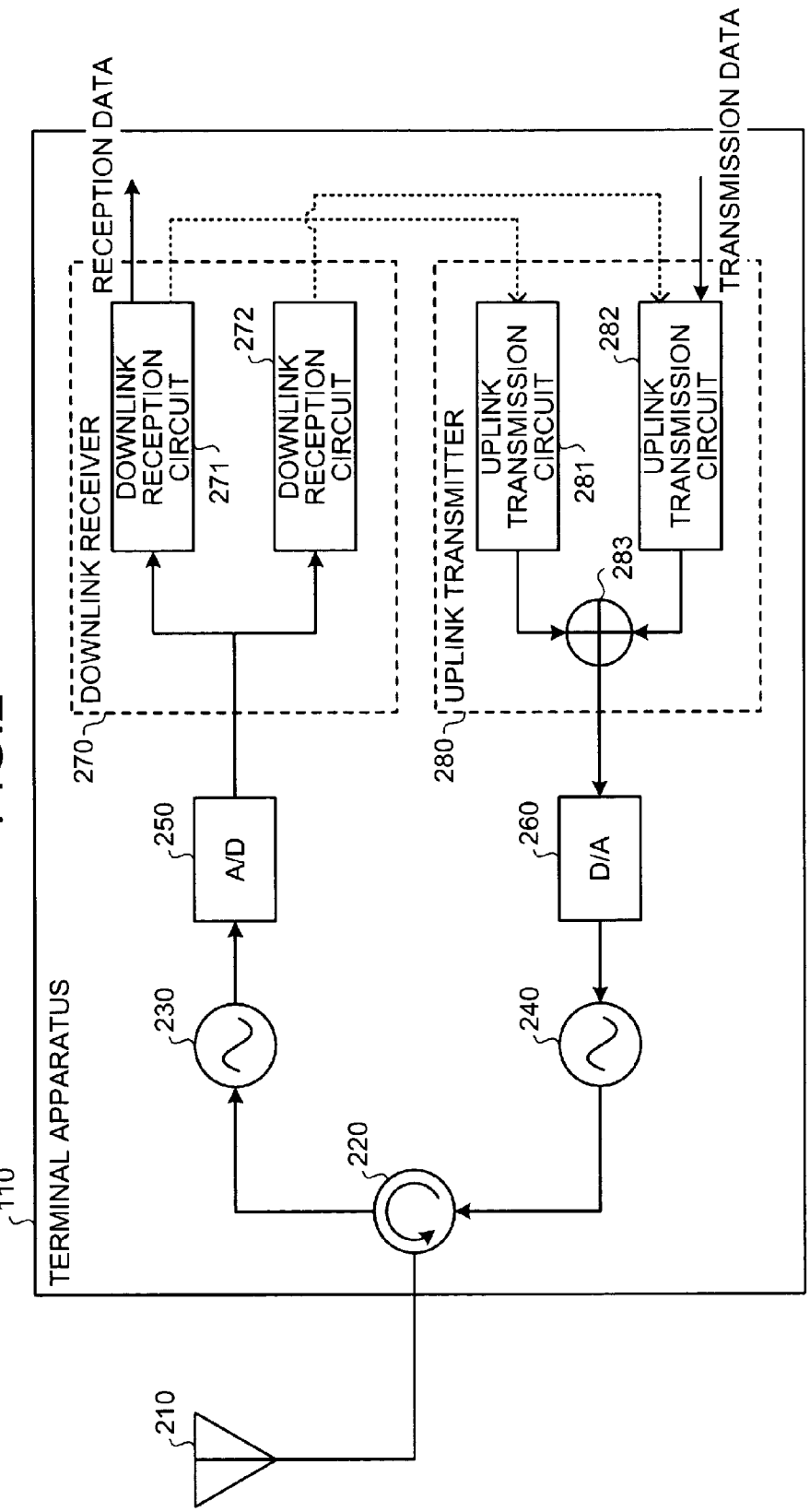
FIG. 2 is a diagram of a terminal apparatus according to the first embodiment.

FIG. 2 is a diagram of the terminal apparatus according to the first embodiment. As depicted in FIG. 1, the terminal apparatus 110 includes an antenna 210, a scheduler 220, frequency conversion circuits 230 and 240, an analog/digital conversion circuit 250, a digital/analog conversion circuit 260, a downlink receiver 270, and an uplink transmitter 280.

The antenna 210 is an antenna for wirelessly communicating with base stations such as the first base station 120 and the second base station 130. The antenna 210 outputs to the scheduler 220, signals received wirelessly. The antenna 210 further wirelessly transmits signals output from the scheduler 220. The scheduler 220 outputs to the frequency conversion circuit 230, signals output from the antenna 210. The scheduler 220 further outputs to the antenna 210, signals output from the frequency conversion circuit 240.

The frequency conversion circuit 230 converts high frequency signals from the scheduler 220 into baseband signals and outputs the baseband signals to the analog/digital conversion circuit 250. The frequency conversion circuit 240 converts baseband signals from the digital/analog conversion circuit 260 into high frequency signals and outputs the high frequency signals to the scheduler 220.

The analog/digital (A/D) conversion circuit 250 converts analog signals output from the frequency conversion circuit 230 into digital signals and outputs the digital signals to the downlink receiver 270. The digital/analog (D/A) conversion circuit 260 converts digital signals output from the uplink transmitter 280 into analog signals and outputs the analog signals to the frequency conversion circuit 240.

The downlink receiver 270 includes downlink reception circuits 271 and 272 for 2 paths. For example, when the terminal apparatus 110 communicates using the first base station 120 for the downlink, the downlink reception circuit 271 receives downlink data and related control information from the first base station 120. The downlink reception circuit 272 receives from the second base station 130, control information related to uplink data transmission.

For example, the downlink reception circuit 271 uses control information related to the first base station 120 and demodulates signals output from the analog/digital conversion circuit 250; and receives signals transmitted from the first base station 120. The downlink reception circuit 271 outputs to an upper level circuit, data signals (received data) among the received signals and outputs to an uplink transmission circuit 281, control information such as acknowledgment information to be fed back to the first base station 120.

The downlink reception circuit 272 uses control information related to the second base station 130 and demodulates signals output from the analog/digital conversion circuit 250; and receives signals transmitted from the second base station 130. The downlink reception circuit 272 outputs control information required for uplink data transmission, such as acknowledgment information and resource allocation information, to an uplink transmission circuit 282 that actually performs the uplink data transmission.

The uplink transmitter 280 includes the uplink transmission circuits 281 and 282 for two paths and an adder circuit 283. For example, when the terminal apparatus 110 communicates using the second base station 130 for the uplink, the uplink transmission circuit 281 transmits uplink data and related control information to the second base station 130. The uplink transmission circuit 282 transmits to the first base station 120, control information related to downlink data transmission. The adder circuit 283 adds the transmission signals output from the uplink transmission circuits 281 and 282, and generates a baseband signal.

For example, the uplink transmission circuit 282 uses the control information that is output from the downlink reception circuit 272 and related to the second base station 130 to modulate transmission data, and outputs the modulated transmission data to the adder circuit 283. The uplink transmission circuit 281 modulates the control information that is output from downlink reception circuit 271 and related to downlink data, and outputs the modulated signal to the adder circuit 283. The adder circuit 283 adds the signals output from the uplink transmission circuits 281 and 282, and outputs the added signals as a baseband signal to the digital/analog conversion circuit 260.

The downlink receiver 270 and the uplink transmitter 280, respectively, can be implemented, for example, by a digital signal processor (DSP). However, the downlink receiver 270 and the uplink transmitter 280 may also be implemented by a single DSP.

In this manner, in the communication system 100 according to the first embodiment, the terminal apparatus 110 uses different base stations for uplink and downlink data transmission. Consequently, even when the optimal base station for uplink and downlink differ, communication quality can be improved. For example, for the downlink, the terminal apparatus 110 communicates with the base station (e.g., the first base station 120) for which the reception strength at the terminal apparatus 110 is greater. Further, for the uplink, the terminal apparatus 110 communicates with the base station (e.g., the second base station 130) for which propagation loss is less and the reception strength at the base station is greater.

Further, since control information for performing data transmission is transmitted bidirectionally between the base stations, the scheduling process performed at each of the base stations can be simplified. For example, without forwarding control information among the base stations, the scheduling process performed at each base station can be performed independently for each base station. Consequently, delays consequent to control information forwarding can be prevented, and stable scheduling can be performed by a simple process.

Compared to data, the volume of traffic for control information is less. Therefore, even if bidirectional transmission is performed for the control information, signal loss is low and communication quality is affected minimally. In this manner, by using different base stations for uplink and downlink data transmission and bidirectionally transmitting control information between base stations, the scheduling process at each of the base stations can be simplified and stable communication can be performed.

In the first embodiment, when bidirectional transmission of control information is simply enabled, communication that is in the same link direction, but with a different base station occurs. For example, the terminal apparatus 110 may simultaneously transmit control information to the first base station 120, and uplink data and control information to the second base station 130. Further, the terminal apparatus 110 may simultaneously receive control information from the second base station 130 while receiving downlink data and control information from the first base station 120.

Further, at the terminal apparatus 110, complete synchronization of communication with the first base station 120 and communication with the second base station 130 is difficult. Therefore, when communication is performed in the same direction but with different base stations, for example, at the terminal apparatus 110, two independently operating communication circuits are provided (e.g., the downlink reception circuits 271, 272 and the uplink transmission circuits 281, 282 depicted in FIG. 2).

The maximum transmission strength of the terminal apparatus 110 is limited by, for example, the antenna 210 and is constant. Therefore, when signals are simultaneously transmitted to different base stations, the transmission strength of each signal may become insufficient. In contrast, in the second embodiment, the first base station 120 and the second base station 130 communicate with the terminal apparatus 110 by time division. The fundamental configuration of the communication system according to the second embodiment is similar to that of the communication system according to the first embodiment (see FIG. 1) and thus, description thereof is omitted.

Figure 3:
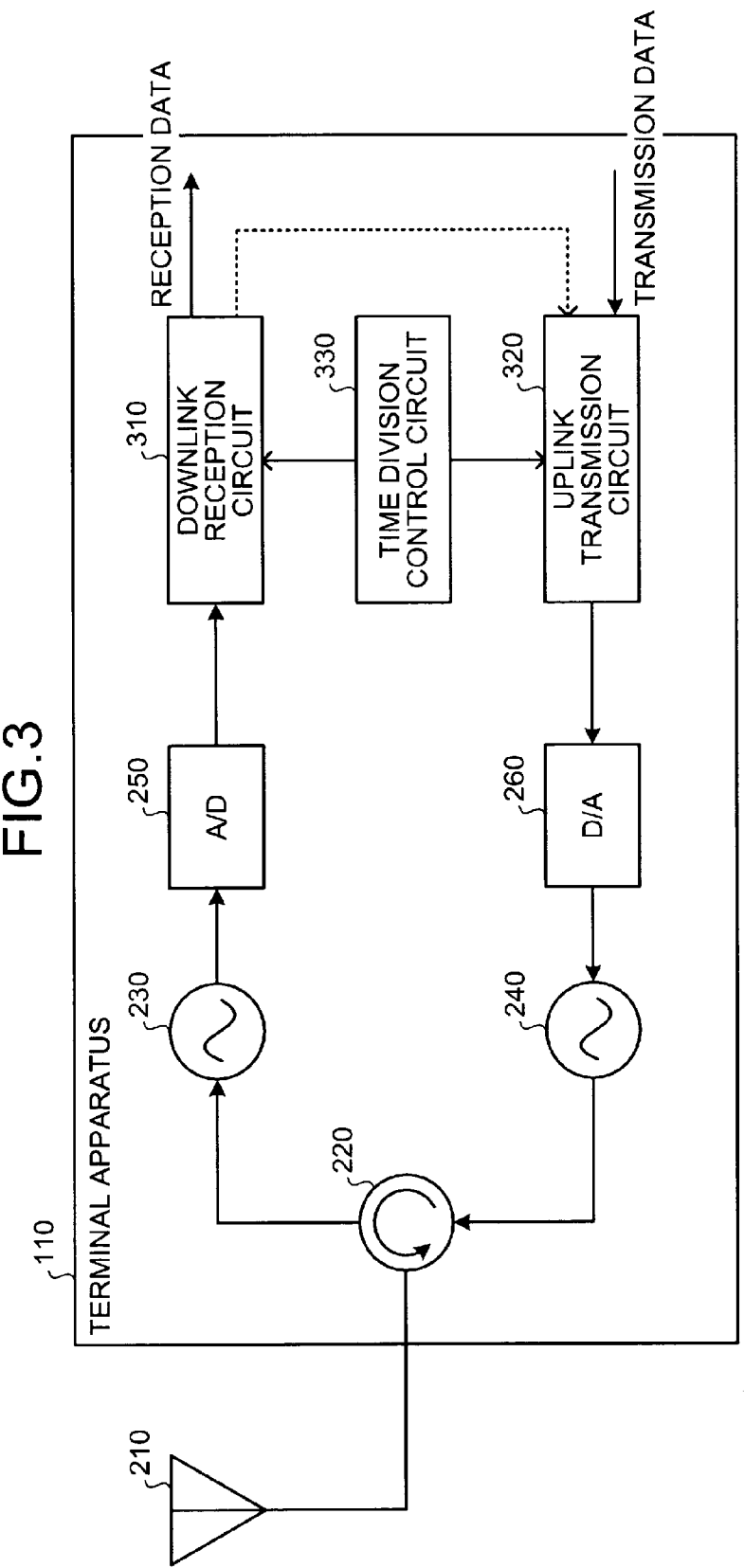
FIG. 3 is a diagram of an example of configuration of the terminal apparatus according to a second embodiment.

FIG. 3 is a diagram of an example of configuration of the terminal apparatus according to the second embodiment. In FIG. 3, components identical to those depicted in FIG. 2 are given the same reference numeral used in FIG. 2 and description thereof is omitted. As depicted in FIG. 3, the terminal apparatus 110 according to the second embodiment includes a downlink reception circuit 310, an uplink transmission circuit 320, and a time division control circuit 330 in place of the downlink receiver 270 and the uplink transmitter 280 depicted in FIG. 2. The downlink reception circuit 310 and the uplink transmission circuit 320, for example, can be implemented by a DSP.

The downlink reception circuit 310 has a function similar to the downlink receiver 270 depicted in FIG. 2. In other words, the downlink reception circuit 310 transmits downlink data from the first base station 120 and receives control information from the first base station 120 and outputs the control information to uplink transmitter. The control information is for uplink data reception. The uplink transmission circuit 320 has a function similar to the uplink transmitter 280 depicted in FIG. 2. In other words, the uplink transmission circuit 320 transmits uplink data to the second base station 130 and transmits control information that is related to the reception of downlink data from the first base station 120, to the first base station 120.

The time division control circuit 330, with respect to the downlink reception circuit 310 and the uplink transmission circuit 320, performs control to switch by time division, the base station targeted for communication. For example, the terminal apparatus 110 receives notification from the first base station 120 and the second base station 130, indicating the mutually differing allocation of time resources. The time division control circuit 330 causes the downlink reception circuit 310 and the uplink transmission circuit 320 to perform (downlink data) communication with respect to the first base station 120 by the time resources indicated by the first base station 120. Further, the time division control circuit 330 causes the downlink reception circuit 310 and the uplink transmission circuit 320 to perform (uplink data) communication with respect to the second base station 130 by the time resources indicated by the second base station 130.

Figure 4:
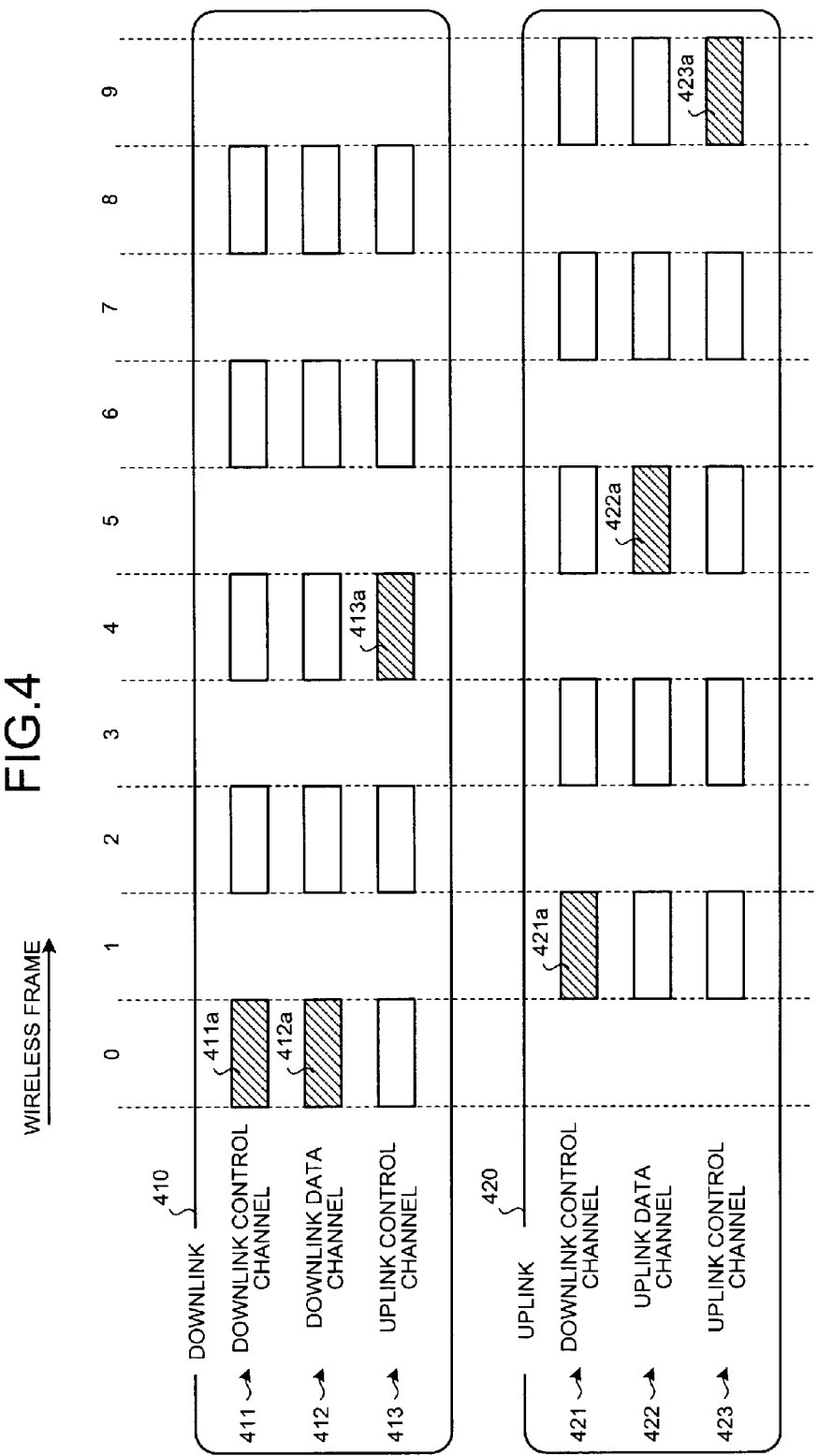
FIG. 4 is a diagram time resource allocation according to the second embodiment.

FIG. 4 is a diagram time resource allocation according to the second embodiment. In FIG. 4, the horizontal axis represents time resources (wireless frames "0" to "9"), which result from time division of the wireless resources. The terminal apparatus 110 depicted in FIG. 3 allocates the wireless resources "0" to "9" are allocated to the downlink reception circuit 310 and the uplink transmission circuit 320, whereby communication by the downlink reception circuit 310 and communication by the uplink transmission circuit 320 are switched between by time division.

A downlink channel 410 is a channel related to downlink communication that the downlink reception circuit 310 of the terminal apparatus 110 performs with respect to the first base station 120. The downlink channel 410 includes a downlink control channel 411, a downlink data channel 412, and an uplink control channel 413. In this example, the even numbered wireless frames "0", "2", "4", "6", and "8" are allocated to the downlink channel 410.

In wireless frame "0", control information 411a of the downlink control channel 411 and data 412a of the downlink data channel 412 are transmitted from the first base station 120 to the terminal apparatus 110. The control information 411a is control information for the terminal apparatus 110 to receive the data 412a and for example, is information indicating the wireless resources allocated for transmitting the data 412a. In wireless frame "4", control information 413a of the uplink control channel 413 is transmitted from the terminal apparatus 110 to the first base station 120. The control information 413a is, for example, acknowledgment information (Ack or Nack) for the data 412a.

An uplink channel 420 is a channel related to uplink communication that the uplink transmission circuit 320 of the terminal apparatus 110 performs with respect to the second base station 130. The uplink channel 420 includes a downlink control channel 421, an uplink data channel 422, and an uplink control channel 423. In this example, the odd numbered wireless frames "1", "3", "5", "7", and "9" are allocated to the uplink channel 420.

For example, in wireless frame "1", control information 421a of the downlink control channel 421 is transmitted from the second base station 130 to the terminal apparatus 110. The control information 421a is control information for the terminal apparatus 110 to transmit data 422a and for example, is information indicating the wireless resources allocated for transmitting the data 422a.

Further, in wireless frame "5", the data 422a of the uplink data channel 422 is transmitted from the terminal apparatus 110 to the second base station 130. In wireless frame "9", control information 423a of the uplink control channel 423 is transmitted from the terminal apparatus 110 to the second base station 130. The uplink control channel 423, for example, is for information requesting the second base station 130 to provide the wireless resources for a subsequent transmission of the data 422a.

In this manner, dividing, among the downlink channel 410 and the uplink channel 420, wireless resources according to time, collision of the communication by the uplink transmission circuit 320 and the communication by the downlink reception circuit 310 can be prevented. Operation of the communication system 100 for dividing wireless resources by time will be described hereinafter.

Figure 5:
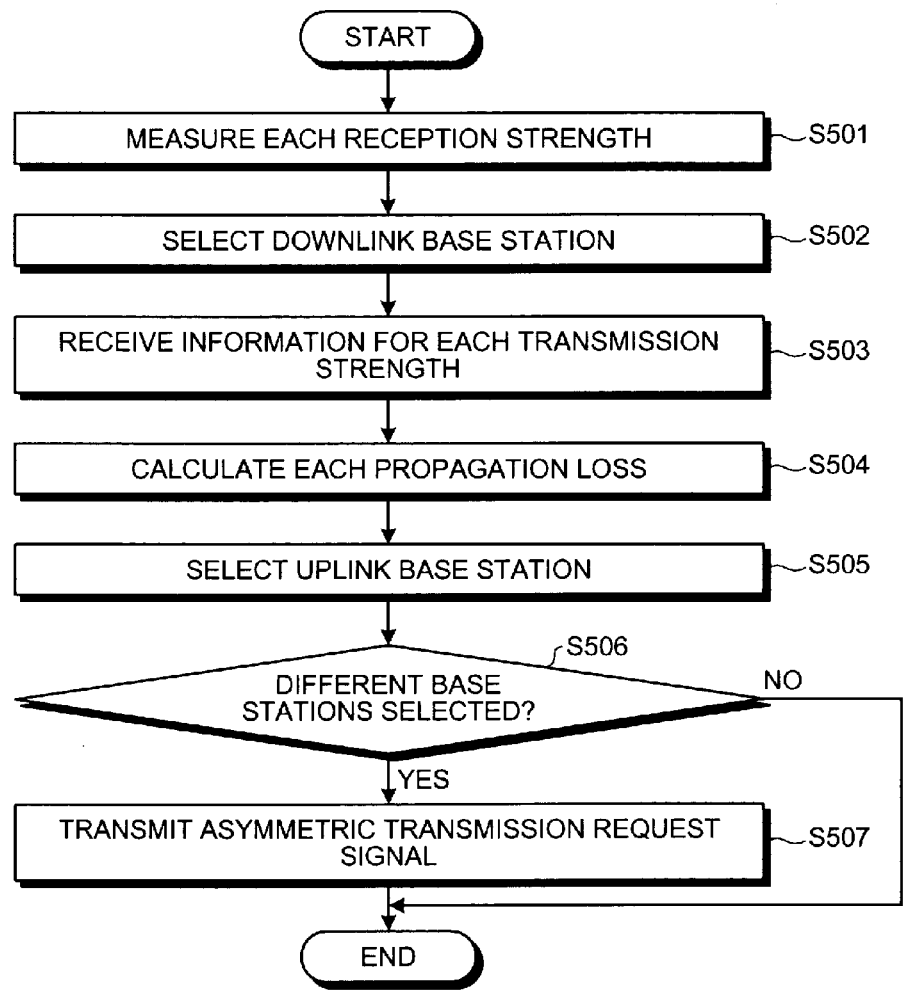
FIG. 5 is a flowchart of an example of operation of the terminal apparatus according to the second embodiment.

FIG. 5 is a flowchart of an example of operation of the terminal apparatus according to the second embodiment. The terminal apparatus 110, for example, performs each of the steps below. The terminal apparatus 110 receives pilot signals respectively transmitted from the first base station 120 and the second base station 130 and measures the respective reception strengths of the first base station 120 and the second base station 130 (step S501).

Based on each reception strength measured at step S501, the terminal apparatus 110 selects a downlink base station from among the first base station 120 and the second base station 130 (step S502). At step S502, for example, the terminal apparatus 110 selects the base station having the greater reception strength among the first base station 120 and the second base station 130, to be the downlink base station.

The terminal apparatus 110 receives transmission strength information transmitted from the first base station 120 and the second base station 130, respectively (step S503). The transmission strength information respectively transmitted from the first base station 120 and the second base station 130 respectively indicate the transmission strength of the pilot signals respectively transmitted by the first base station 120 and the second base station 130.

Based on the reception strengths measured at step S501 and the transmission strength information received at step S503, the terminal apparatus 110 calculates propagation loss for the first base station 120 and the second base station 130, respectively (step S504). Assuming the reception strength measured at step S501 to be TP and the transmission strengths indicated by the transmission strength information received at step S503 to be RP, the propagation loss PL calculated at step S504 can be, for example, expressed as TP-RP.

Based on each propagation loss calculated at step S504, the terminal apparatus 110 selects an uplink base station from among the first base station 120 and the second base station 130 (step S505). As step S505, for example, the terminal apparatus 110 selects the base station having the smaller propagation loss among the first base station 120 and the second base station 130, to be the uplink base station.

The terminal apparatus 110 determines whether the base station selected at step S502 and the base station selected at step S505 are different base stations (step S506). If the same base station has been selected (step S506: NO), the series of operations comes to an end. In this case, the terminal apparatus 110 performs uplink and downlink communication with either the first base station 120 or the second base station 130.

At step S506, if different base stations have been selected (step S506: YES), the terminal apparatus 110 transmits to the base station that is currently performing communication, an asymmetric transmission request requesting asymmetric transmission (step S507), thereby ending the series of operations. The asymmetric transmission request transmitted at step S507 includes information concerning the base station that corresponds to the uplink of the terminal apparatus 110 and the base station that corresponds to the downlink.

For example, assuming that the first base station 120 is selected at step S502 as the downlink base station and the second base station 130 is selected at step S505 as the uplink base station. In this case, the asymmetric transmission request includes information indicating the first base station 120 as the downlink base station and the second base station 130 as the uplink base station.

The base station that has received the asymmetric transmission request uses the asymmetric transmission request to control the second base station 130 to receive uplink data from the terminal apparatus 110 and controls the first base station 120 to transmit downlink data to the terminal apparatus 110. For example, if the first base station 120 receives the asymmetric transmission request, the first base station 120 performs the downlink communication of the terminal apparatus 110 and controls the second base station 130 to perform the uplink communication of the terminal apparatus 110.

Figure 6:
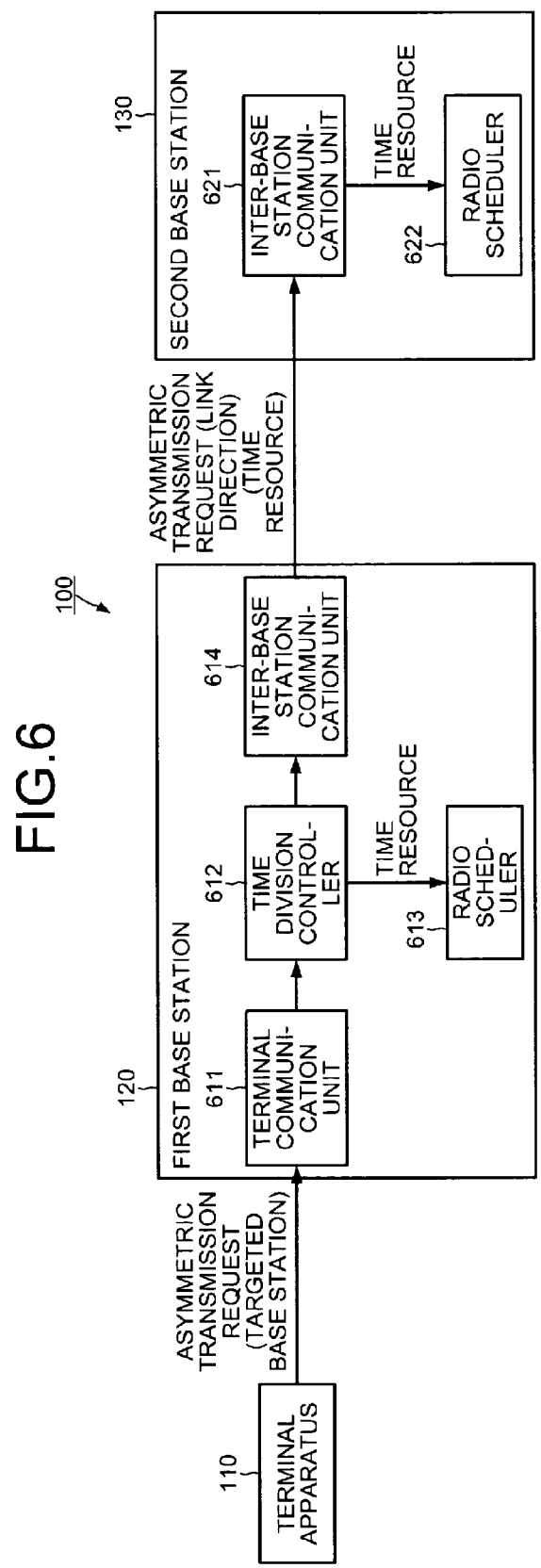
FIG. 6 is a diagram of an example of a process of the communication system according to the second embodiment.

FIG. 6 is a diagram of an example of a process of the communication system according to the second embodiment. In FIG. 6, components identical to those depicted in FIG. 1 are given the same reference numerals used in FIG. 1 and description thereof is omitted. In this example, while the terminal apparatus 110 is communicating with the first base station 120, the first base station 120 is selected as the downlink base station at step S502 in FIG. 5 and the second base station 130 is selected as the uplink base station at step S505.

In this case, the terminal apparatus 110 transmits an asymmetric transmission request (request signal) to the first base station 120 at step S507 in FIG. 5. The asymmetric transmission request transmitted by the terminal apparatus 110 includes correspondence information that indicates the base station that corresponds to the uplink and the base station that corresponds to the downlink in the asymmetric transmission.

The first base station 120 includes a terminal communication unit 611, a time division controller 612, a radio scheduler 613, and an inter-base station communication unit 614. The terminal communication unit 611 receives and outputs to the time division controller 612, the asymmetric transmission request transmitted from the terminal apparatus 110. The time division controller 612, based on the correspondence information included in the asymmetric transmission request output from the terminal communication unit 611, allocates time resources for the uplink and the downlink.

For example, the time division controller 612 allocates the odd numbered wireless frames "1", "3", "5", "7", and "9" to the uplink and allocates the even numbered wireless frames "0", "2", "4", "6", and "8" to the downlink (see FIG. 4). The time division controller 612 notifies the radio scheduler 613 of the wireless resources allocated to the downlink.

Further, the time division controller 612 notifies the second base station 130 of the asymmetric transmission request, via the inter-base station communication unit 614. The asymmetric transmission request transmitted by the time division controller 612 includes link direction information that indicates that the second base station 130 corresponds to the uplink and information indicating the time resources allocated to the uplink.

The radio scheduler 613 performs downlink scheduling from the first base station 120 to the terminal apparatus 110, using the time resources indicated by the time division controller 612. Based on the scheduling result from the radio scheduler 613, the first base station 120 performs downlink communication with the terminal apparatus 110.

The second base station 130 includes an inter-base station communication unit 621, and a radio scheduler 622. The inter-base station communication unit 62 receives the asymmetric transmission request transmitted from the first base station 120. The inter-base station communication unit 621 notifies the radio scheduler 622 of the link direction and the time resources included in the received asymmetric transmission request.

The radio scheduler 622 performs uplink scheduling from the terminal apparatus 110 to the second base station 130, using the time resources indicated by the inter-base station communication unit 621. The second base station 130, based on the scheduling result from the radio scheduler 622, performs uplink communication with the terminal apparatus 110.

Transmission of the asymmetric transmission request between the terminal apparatus 110 and the first base station 120 is performed through respective wireless communication interfaces. Further, the transmission of the asymmetric transmission request between the first base station 120 and the second base station 130 is performed through respective communication interfaces and, for example, is implemented by wired communication.

Figure 7:
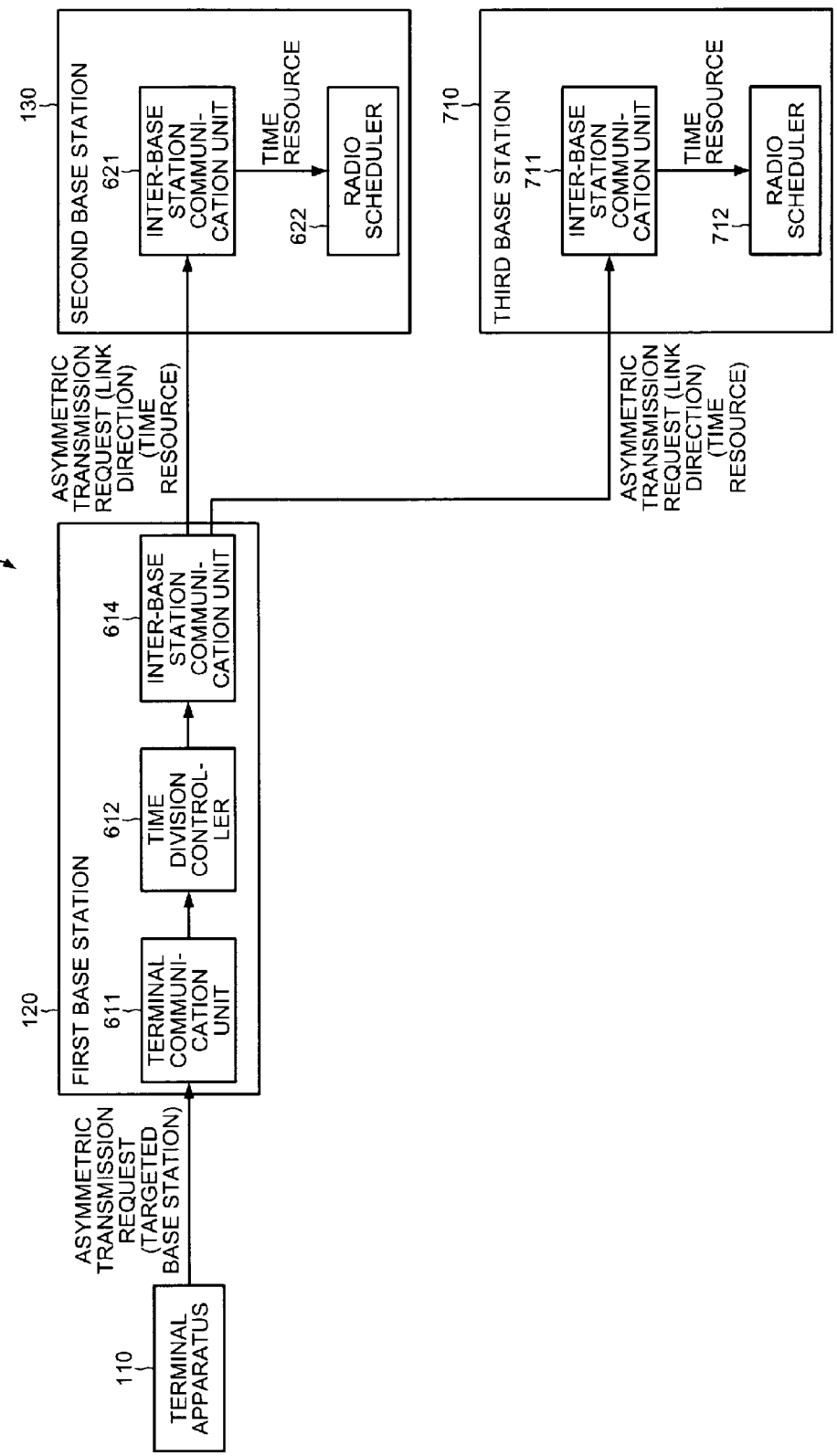
FIG. 7 is a diagram of a modified example of a process of the communication system depicted in FIG. 6.

FIG. 7 is a diagram of a modified example of a process of the communication system depicted in FIG. 6. In FIG. 7, components identical to those depicted in FIG. 6 are given the same reference numerals and description thereof is omitted. In this example, the communication system 100 includes the terminal apparatus 110, the first base station 120, the second base station 130, and a third base station 710. Further, while the terminal apparatus 110 is communicating with the first base station 120, the second base station 130 is selected as the uplink base station at step S502 in FIG. 5 and the third base station 710 is selected as the downlink base station at step S505.

In this case, the terminal apparatus 110 the terminal apparatus 110 transmits an asymmetric transmission request to the first base station 120 at step S507 in FIG. 5. The time division controller 612 transmits the asymmetric transmission request, via the inter-base station communication unit 614, to the second base station 130 and the third base station 710.

The asymmetric transmission request provided to the second base station 130 includes link direction information indicating that the second base station 130 corresponds to the uplink and information indicating the time resources allocated to the uplink. The asymmetric transmission request provided to the third base station 710 includes link direction information indicating that the third base station 710 corresponds to the downlink and information indicating the time resources allocated for the downlink.

The third base station 710 includes an inter-base station communication unit 711 and a radio scheduler 712. The inter-base station communication unit 711 receives the asymmetric transmission request transmitted from the first base station 120. The inter-base station communication unit 711 notifies the radio scheduler 712 of the link direction and the time resources included in the received asymmetric transmission request.

The radio scheduler 712 performs downlink scheduling from the third base station 710 to the terminal apparatus 110, using the time resources indicated by the inter-base station communication unit 711. The third base station 710, based on the scheduling result from the radio scheduler 712, performs downlink communication with the terminal apparatus 110. In this manner, the base station that has received the asymmetric transmission request from the terminal apparatus 110 may be a base station that does not correspond to the uplink and the downlink.

In this manner, in the communication system 100 according to the second embodiment, uplink communication and downlink communication are mutually performed by time division. Consequently, communication that is in the same direction, but with different base stations can be prevented.

Thus, the effects of the communication system 100 according to the first embodiment can be achieved and communication circuit of the terminal apparatus 110 can be simplified, enabling reductions in the manufacturing cost and power consumption of the terminal apparatus 110. Further, since the simultaneous transmission of signals to different base stations can be prevented, transmission strength of the signals can be assured, enabling communication quality to be improved.

Figure 8:
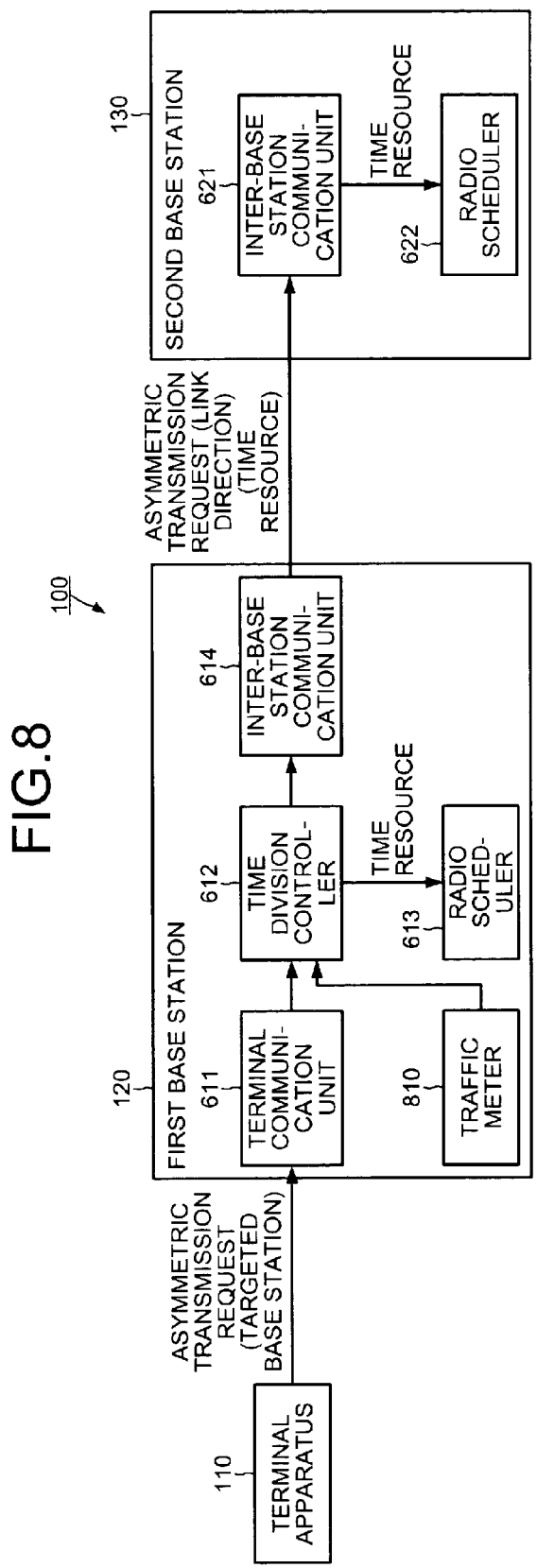
FIG. 8 is a diagram of an example of operation of the communication system according to a third embodiment.

FIG. 8 is a diagram of an example of operation of the communication system according to a third embodiment. In FIG. 8, components identical to those depicted in FIG. 6 are given the same reference numerals used in FIG. 6 and description thereof is omitted. As depicted in FIG. 8, the first base station 120 includes a traffic meter 810 in addition to the configuration depicted in FIG. 6.

The traffic meter 810 measures the uplink traffic at the terminal apparatus 110 and the downlink traffic at the terminal apparatus 110. For example, the traffic meter 810 acquires downlink request information transmitted by the terminal apparatus 110 to the first base station 120 and uplink request information transmitted by the terminal apparatus 110 to the second base station 130 and based on the acquired request information, measures the uplink and downlink traffic, respectively.

The traffic meter 810 notifies the time division controller 612 of the measured uplink and downlink traffic. The notification of the uplink and downlink traffic from the traffic meter 810 to the time division controller 612 may be performed periodically, or may be performed when the first base station 120 receives an asymmetric transmission request from the terminal apparatus 110.

The time division controller 612, based on the uplink and the downlink traffic indicated by the traffic meter 810, calculates the ratio of uplink data rate at the terminal apparatus 110 and the downlink data rate at the terminal apparatus 110. The time division controller 612 allocates time resources to the uplink and the downlink of the terminal apparatus 110 to become as close as possible to the calculated ratio of the data rates.

For example, if the downlink data rate is 384 [kbps] and the uplink data rate is 128 [kbps], the time division controller 612 performs allocation for a 3:1 ratio of the downlink data rate to the uplink data rate. In this case, the time division controller 612 performs allocations such that the time resources allocated to the downlink and the time resources allocated to the uplink are at a ratio of 3:1 (see, for example, FIG. 9).

Figure 9:
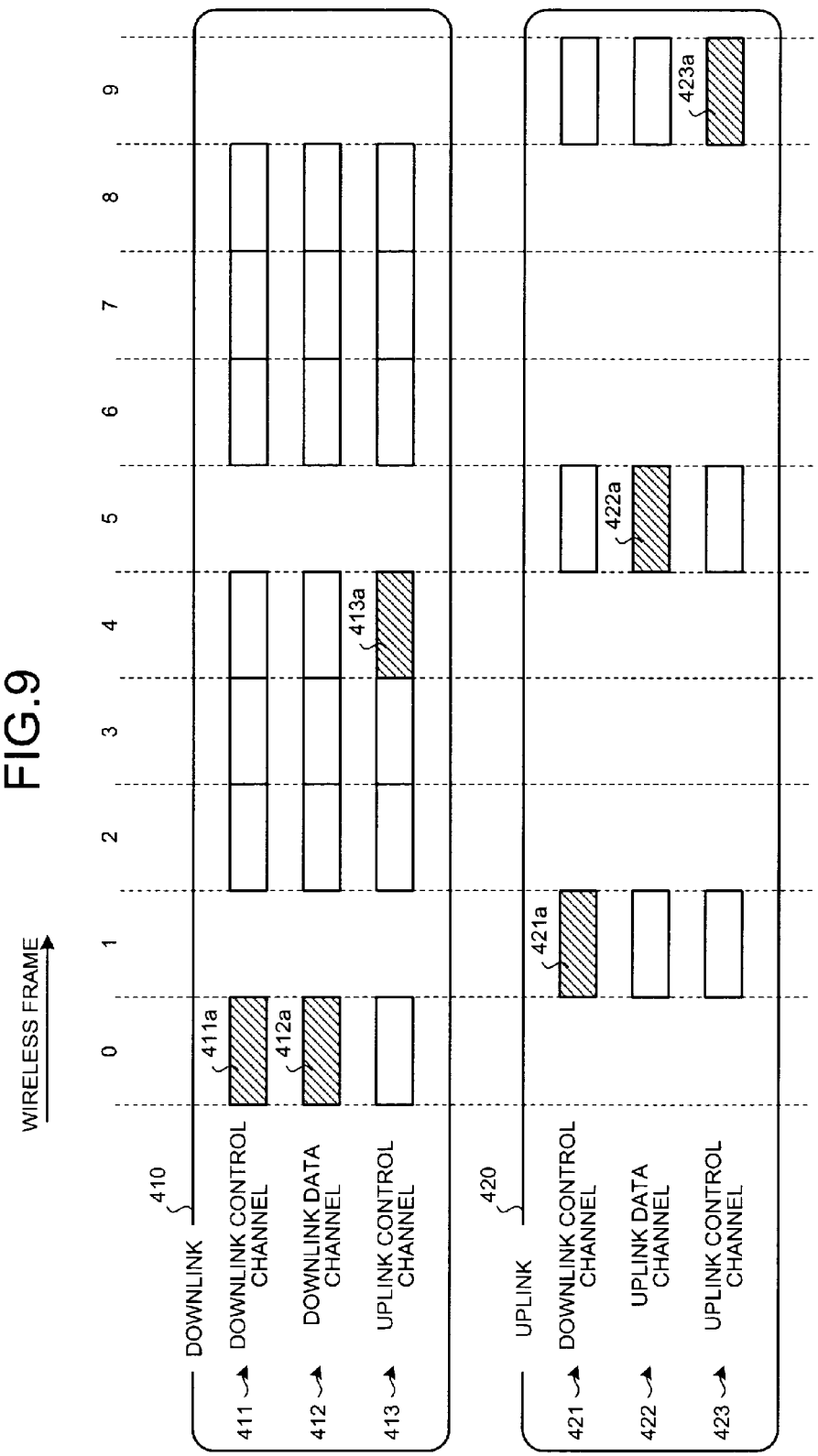
FIG. 9 is a diagram of time resource allocation according to the third embodiment.

FIG. 9 is a diagram of time resource allocation according to the third embodiment. In FIG. 9, components identical to those depicted in FIG. 4 are given the same reference numerals used in FIG. 4 and description thereof is omitted. In this example, the traffic measured by the traffic meter 810 is assumed to be 384 [kbps] for the downlink data rate and 128 [kbps] for the uplink data rate, giving a downlink to uplink ratio of 3:1.

In this case, the time division controller 612, for example, allocates wireless frames "0", "2", "3", "4", "6", "7", and "8" to the downlink channel 410. Further, the time division controller 612 allocates wireless frames "1", "5", and "9" to the uplink channel 420.

Consequently, the time resources allocated to the downlink and the time resources allocated to the uplink have a ratio of approximately 3:1. In this manner, in the process of time resource allocation, time resource allocation to the downlink and the uplink can be changed according to the amount of uplink and downlink traffic.

In this manner, in the communication system 100 according to the third embodiment, time resources can be allocated to the uplink and the downlink of the terminal apparatus 110, based on the uplink data traffic and the downlink data traffic. Consequently, time resources can be efficiently allocated to the uplink and the downlink. For example, during data transmission, the amount of uplink traffic and downlink traffic differ greatly. Therefore, by allocating time resources according to the amount of uplink data and downlink data traffic, time resources can be efficiently used.

Figure 10:
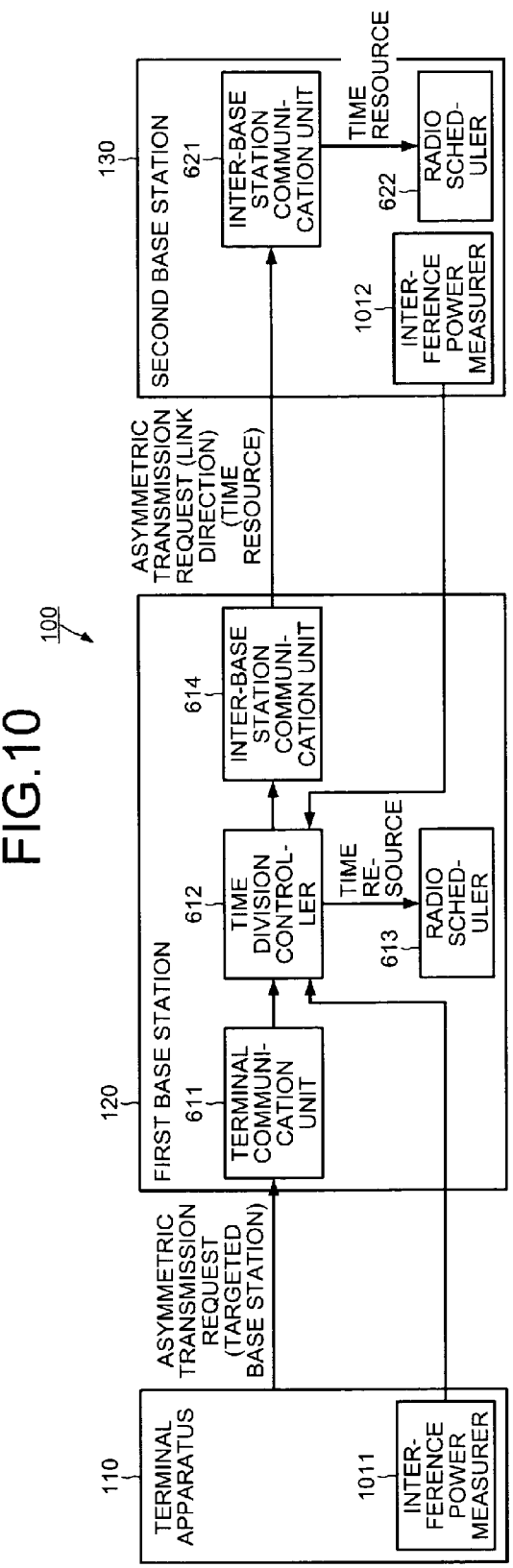
FIG. 10 is a diagram of an example of operation of the communication system according to a fourth embodiment.

FIG. 10 is a diagram of an example of operation of the communication system according to a fourth embodiment. In FIG. 10 components identical to those depicted in FIG. 6 are given the same reference numerals used in FIG. 6 and description thereof is omitted. As depicted in FIG. 10, the terminal apparatus 110 according to the fourth embodiment includes an interference power measurer 1011. Further, the second base station 130 according to the fourth embodiment includes an interference power measurer 1012 in addition to the configuration depicted in FIG. 6.

The interference power measurer 1011 of the terminal apparatus 110 measures the downlink interference power from the first base station 120 to the terminal apparatus 110, for each wireless frame into which the wireless resources are time divided. For example, the interference power measurer 1011 measures interference power, based on a signal (e.g., a pilot signal) transmitted from the first base station 120. The interference power measurer 1011 notifies the first base station 120 of the measured interference power.

The interference power measurer 1012 of the second base station 130 measures the uplink interference power from the terminal apparatus 110 to the second base station 130, for each wireless frame into which the wireless resources are divided. For example, the interference power measurer 1012 measures the interference power, based on a signal (e.g., a pilot signal) transmitted from the terminal apparatus 110. The interference power measurer 1012 notifies the first base station 120 of the measured interference power.

Notification of the interference power from the interference power measurer 1011 to the first base station 120 may be performed periodically, or may be performed when the terminal apparatus 110 transmits an asymmetric transmission request to the first base station 120. Further, the notification of the interference power from the interference power measurer 1012 to the first base station 120 may be performed periodically, or may be performed when the interference power measurer 1012 receives an asymmetric transmission request from the first base station 120.

The time division controller 612 of the first base station 120 allocates time resources to the uplink and the downlink respectively, based in the downlink interference power indicated by the terminal apparatus 110 and the uplink interference power indicated by the second base station 130.

For example, based on the downlink interference power indicated for each wireless frame by the terminal apparatus 110, the time division controller 612 preferentially allocates to the downlink, wireless frames having a low downlink interference power. Further, based on the uplink interference power indicated for each wireless frame by the second base station 130, the time division controller 612 preferentially allocates to the uplink, wireless frames having a low uplink interference power.

Notification of the interference power between the terminal apparatus 110 and the first base station 120 is performed through respective wireless communication interfaces. Further, the notification of the interference power between the first base station 120 and the second base station 130 is performed through respective communication interfaces and, for example, is implemented by wired communication.

Figure 11:
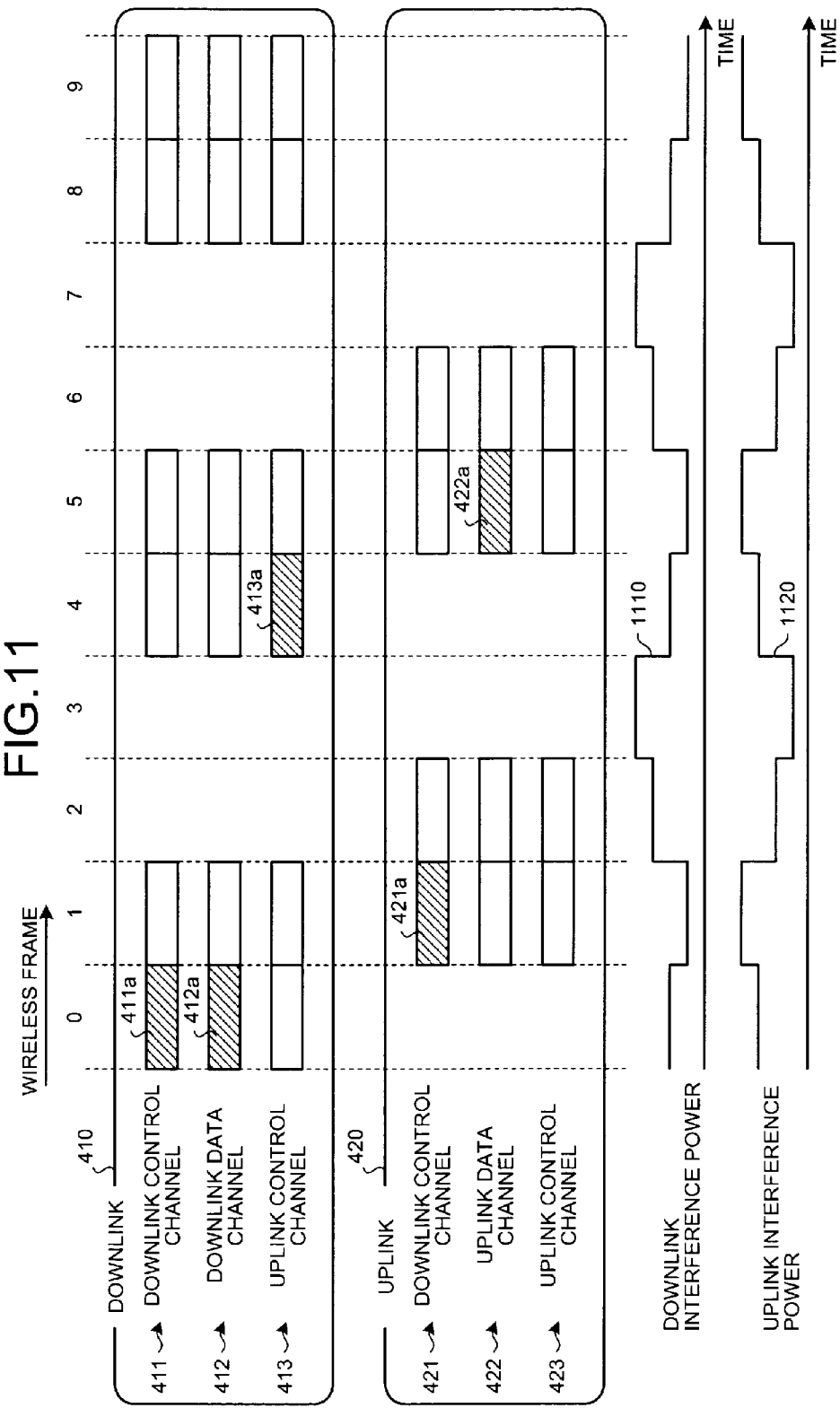
FIG. 11 is a diagram of an example of time resource allocation according to the fourth embodiment.

FIG. 11 is a diagram of an example of time resource allocation according to the fourth embodiment. In FIG. 11, components identical to those depicted in FIG. 4 are given the same reference numerals used in FIG. 4 and description thereof is omitted. An interference power curve 1110 indicates the average downlink interference power from the first base station 120 to the terminal apparatus 110, for each wireless frame. This average, for example, is calculated at constant intervals. In this example, the interference power curve 1110 is relatively small at wireless frames "0", "1", "4", "5", "8", and "9" and relatively large at wireless frames "2", "3", "6", and "7".

An interference power curve 1120 indicates the average uplink interference power from the terminal apparatus 110 to the second base station 130, for each wireless frame. This average, for example, is calculated at constant intervals. The interference power curve 1120 is relatively large at wireless frames "0", "1", "4", "5", "8", and "9" and is relatively small at wireless frames "2", "3", "6", and "7".

The time division controller 612 allocates to the downlink from the first base station 120 to the terminal apparatus 110, wireless frames "0", "1", "4", "5", "8", and "9" for which the interference power curve 1110 is small. Further, the time division controller 612 allocates to the uplink from the terminal apparatus 110 to the second base station 130, wireless frames "2", "3", "6", and "7" for which the interference power curve 1120 is relatively small. In this manner, the time division controller 612, based on the measured interference power, automatically allocates time resources such that the interference power becomes small.

In this manner, in the communication system 100 according to the fourth embodiment, time resources are allocated to the uplink and the downlink of the terminal apparatus 110, based on the interference power of uplink data and downlink data. Consequently, since time resources having low interference power can be preferentially allocated to the uplink and the downlink, communication quality can be improved.

In the communication system 100, a portion of the control channel may be transmitted and received by a base station that is not the optimal base station. For example, although the first base station 120 is the optimal base station for the downlink at the terminal apparatus 110, the downlink control information 153 (see FIG. 1) is transmitted from the second base station 130 to the terminal apparatus 110. Further, although the second base station 130 is the optimal base station for the uplink at the terminal apparatus 110, the uplink control information 143 (see FIG. 1) is transmitted from the terminal apparatus 110 to the first base station 120.

The downlink control information 153 and the uplink control information 143 are transmitted to base stations that are not the optimal base stations and consequently, compared to transmission to the optimal base stations, transmission strength becomes strong. As a result, interference between the first base station 120 and the second base station 130 consequent to the downlink control information 153 and the uplink control information 143 may occur. In particular, when the transmission strength of the uplink control information 143 becomes great, interference of communication to the second base station 130 may increase, causing communication quality to deteriorate.

Figure 12:
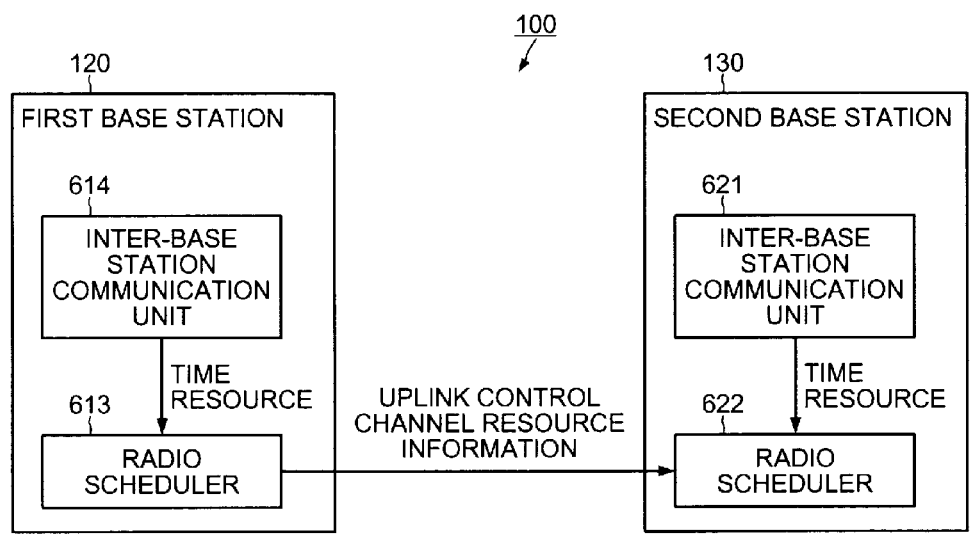
FIG. 12 is a diagram of a process of the communication system according to a fifth embodiment.

FIG. 12 is a diagram of a process of the communication system according to the fifth embodiment. In FIG. 12, components identical to those depicted in FIG. 6 are given the same reference numerals used in FIG. 6 and description thereof is omitted. As depicted in FIG. 12, the radio scheduler 613 of the first base station 120 notifies the second base station 130 of the wireless resources allocated to the uplink control channel of the downlink at the terminal apparatus 110 (uplink control channel resource information).

The radio scheduler 622 of the second base station 130 allocates for each communication of the second base station 130, wireless resources that are different from the wireless resources indicated by the radio scheduler 613 of the first base station 120. For example, the radio scheduler 622 prohibits subsequent use of the wireless resources indicated by the radio scheduler 613. Further, if the wireless resources indicated by the radio scheduler 613 have already been allocated, the radio scheduler 622 performs reallocation of other available time resources.

Figure 13:
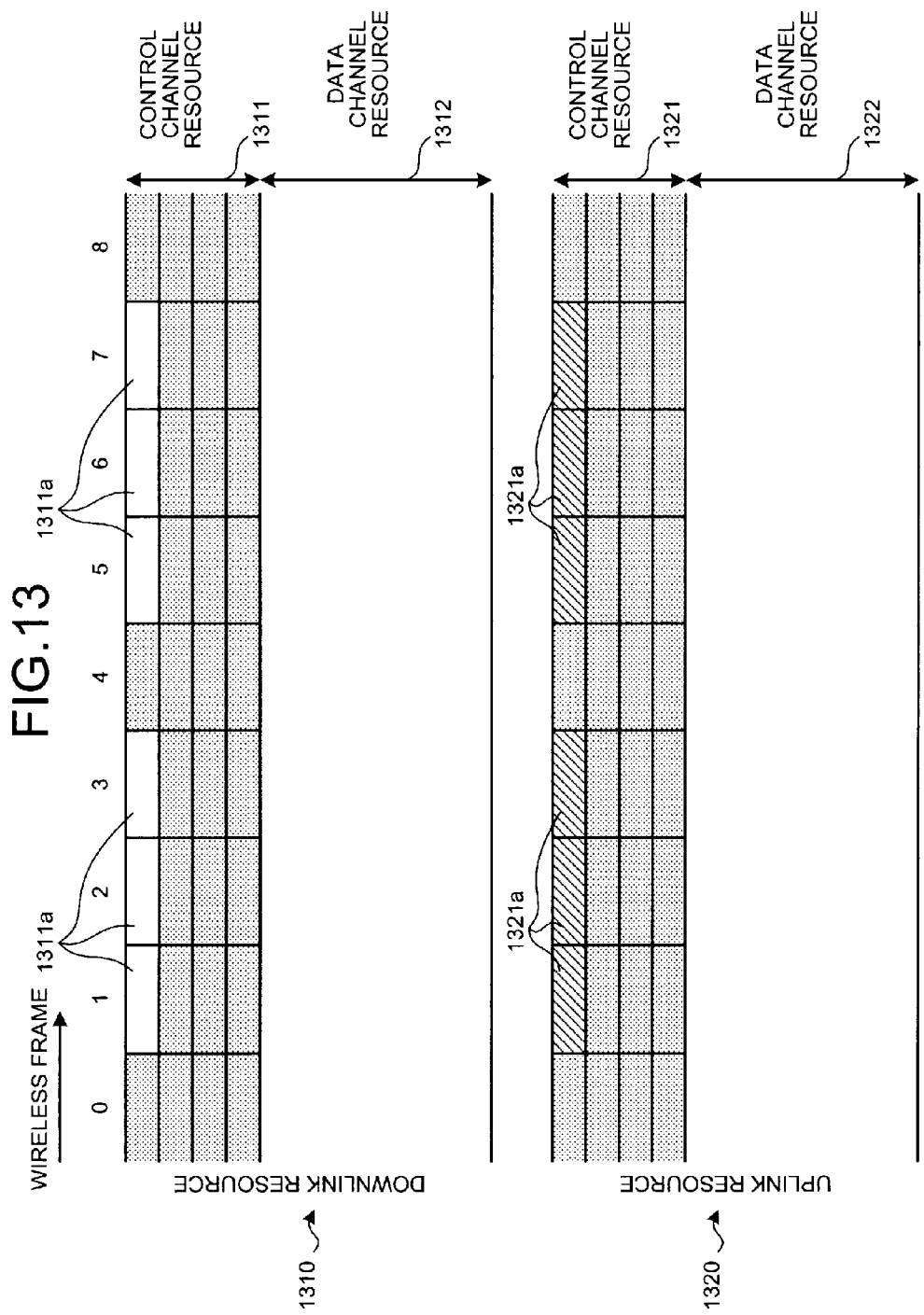
FIG. 13 is a diagram of an example of time resource allocation according to the fifth embodiment.

FIG. 13 is a diagram of an example of time resource allocation according to the fifth embodiment. In FIG. 13, components identical to those depicted in FIG. 4 are given the same reference numerals used in FIG. 4 and description thereof is omitted. In FIG. 13, the horizontal axis represents wireless frames (time resources). The vertical axis in FIG. 13 represents frequency resources.

Downlink resources 1310 represent wireless resources allocated to the downlink of the terminal apparatus 110. The downlink resources 1310 include control channel resources 1311 and data channel resources 1312. A wireless resource 1311a among the control channel resources 1311 is a wireless resource allocated to the uplink control channel of the downlink of the terminal apparatus 110.

Uplink resources 1320 represent wireless resources allocated to the uplink of the terminal apparatus 110. The uplink resources 1320 include control channel resources 1321 and data channel resources 1322. A wireless resource 1321a among the control channel resources 1321 is the same wireless resource (the wireless resource 1311a) of the control channel resources 1311.

The radio scheduler 613 of the first base station 120 notifies the second base station 130 of the wireless resource 1321a allocated to the uplink control channel of the downlink of the terminal apparatus 110. The radio scheduler 622 of the second base station 130, based on the notification from the radio scheduler 613 of the first base station 120, allocates to each communication of the second base station 130, a wireless resource that is different from the wireless resource 1321a.

In this manner, in the communication system 100 according to the fifth embodiment, the first base station 120 notifies the second base station 130 of the wireless resources allocated for the control information that is received from the terminal apparatus 110 and for downlink data transmission. The second base station 130 allocates to each communication at the second base station 130, a wireless resource that is different from the time resource notified by the first base station 120. As a result, interference of communication to the second base station 130 consequent to increased transmission strength of the control information can be prevented.

Further, the second base station 130 may notify the first base station 120 of the wireless resources allocated for the control information that is received from the terminal apparatus 110 and for uplink data reception. In this case, the first base station 120 allocates to each communication at the first base station 120, a wireless resource that is different from the time resource notified by the second base station 130. Consequently, interference of communication to the first base station 120 consequent to increased transmission strength of the control information can be prevented.

Figure 14:
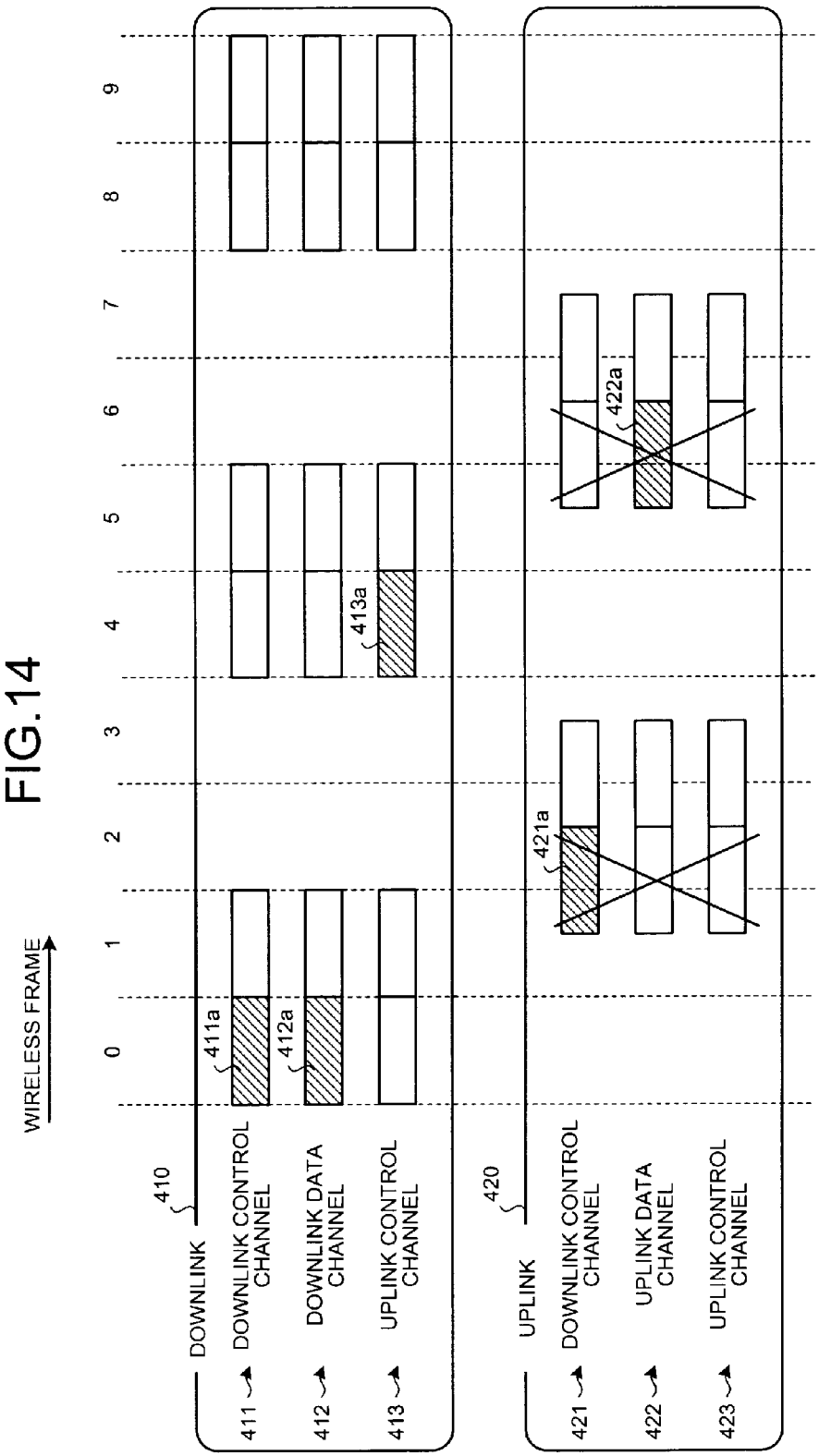
FIG. 14 is a diagram of an example of timing overlap of the uplink and the downlink.

FIG. 14 is a diagram of an example of timing overlap of the uplink and the downlink. Even when different wireless frames are allocated for the uplink and the downlink, if the timing of the downlink communication and the uplink communication deviate, the uplink and downlink communication may temporally overlap.

For example, as depicted in FIG. 14, if the timing of uplink communication becomes advances relative to the downlink communication, the uplink and downlink communication overlap. During an interval when the uplink and downlink communication temporally overlap, either the downlink communication or the uplink communication is unable to be performed.

Figure 15:
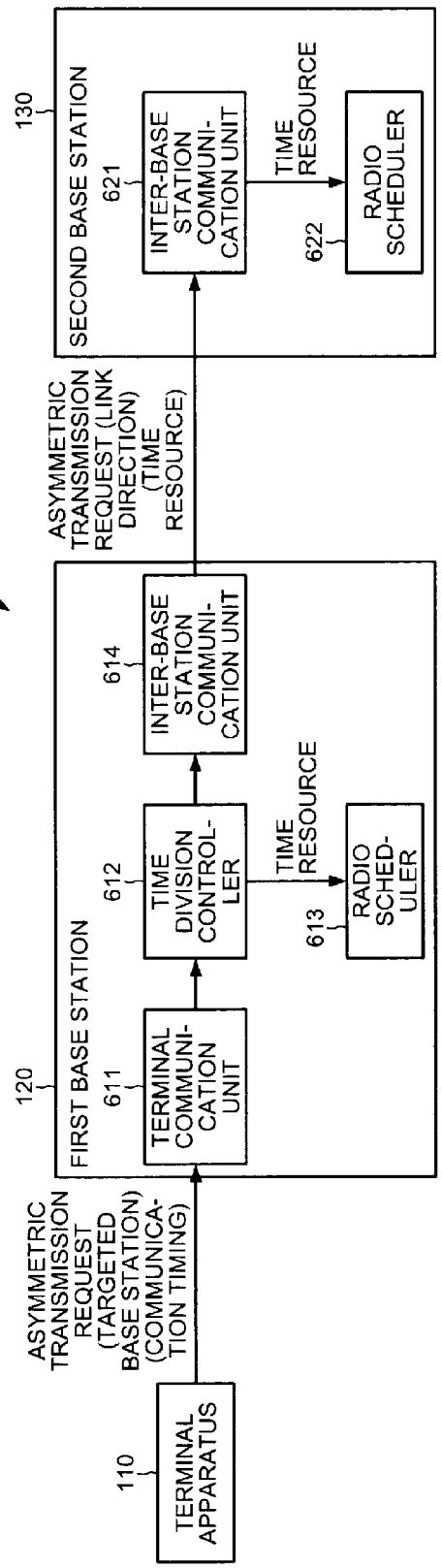
FIG. 15 is a diagram of an example of a process of the communication system according to a sixth embodiment.

FIG. 15 is a diagram of an example of a process of the communication system according to the sixth embodiment. In FIG. 15 components identical to those depicted in FIG. 6 are given the same reference numerals used in FIG. 6 and description thereof is omitted. The terminal apparatus 110, based on the pilot signal periodically transmitted from the first base station 120, measures the communication timing at the first base station 120. Further, the terminal apparatus 110, based on the pilot signal periodically transmitted from the second base station 130, measures the communication timing at the second base station 130. The terminal apparatus 110 transmits to the first base station 120, an asymmetric transmission request that includes information indicating the communication timings measured for the first base station 120 and the second base station 130, respectively.

The time division controller 612, based on the information included in the asymmetric transmission request and indicating the communication timings for the first base station 120 and the second base station 130, respectively, allocates time resources to the uplink and the downlink. For example, the time division controller 612 allocates the time resources to have a guard time that is based on each of the communication timings, such that the communication timing of the downlink by the first base station 120 and the uplink by the second base station 130 do not overlap.

Figure 16:
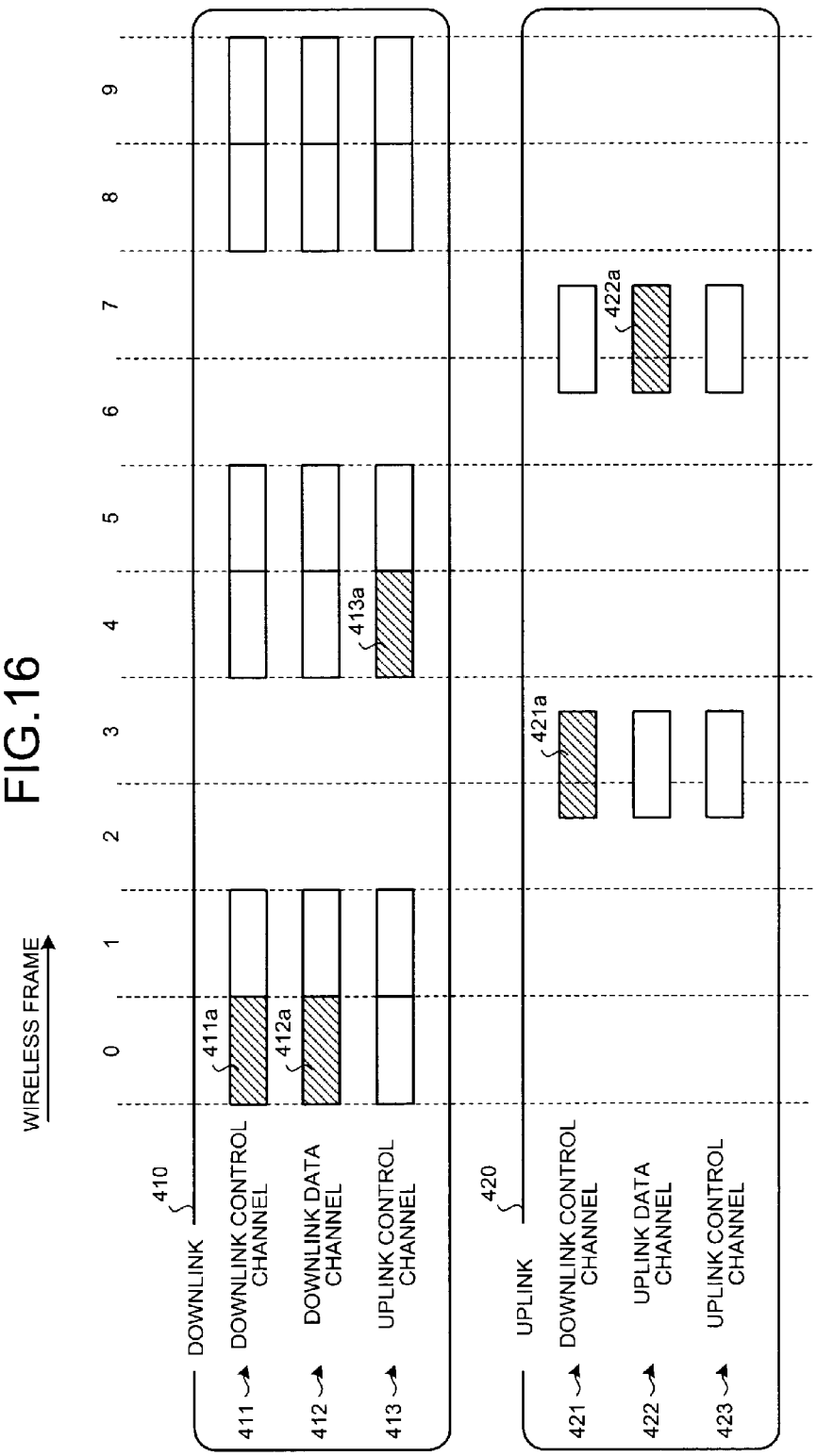
FIG. 16 is a diagram of an example of a time resource allocation process according to the sixth embodiment.

FIG. 16 is a diagram of an example of a time resource allocation process according to the sixth embodiment. In FIG. 16, components identical to those depicted in FIG. 4 are given the same reference numerals used in FIG. 4 and description thereof is omitted. In this example, wireless frames "0", "1", "4", "5", "8", and "9" are allocated to the downlink channel 410. Further, wireless frames "2", "3", "6", and "7" are allocated to the uplink channel 420.

In this manner, the time division controller 612 of the first base station 120 allocates the time resources to have a guard time that is based on each of the communication timings, such that the communication timing of the downlink by the first base station 120 and the uplink by the second base station 130 do not overlap. Here, the communication timing of the downlink and the uplink do not overlap by allocating to the downlink, time resources that are sufficiently long.

In this manner, in the communication system 100 according to the sixth embodiment, the terminal apparatus 110 measures the communication timing of the first base station 120 and the communication timing of the second base station 130. The first base station 120 and the second base station 130 allocate to the uplink and the downlink, time resources to have a guard time that is based on the respective timings measured by the terminal apparatus 110. As a result, even if the communication timing of the first base station 120 and the communication timing of the second base station 130 deviate, a guard time is set so that the uplink and the downlink do not temporally overlap, enabling improvement of the communication quality.

In each of the embodiments, as depicted in FIG. 1, an example has been described in which the first base station 120 and the second base station 130 are different base stations. In this case, the first base station 120 and the second base station 130, for example, mutually perform communication through a backbone network. In contrast, a configuration may be such that the first base station 120 and the second base station 130 are included the same base station.

Figure 17:
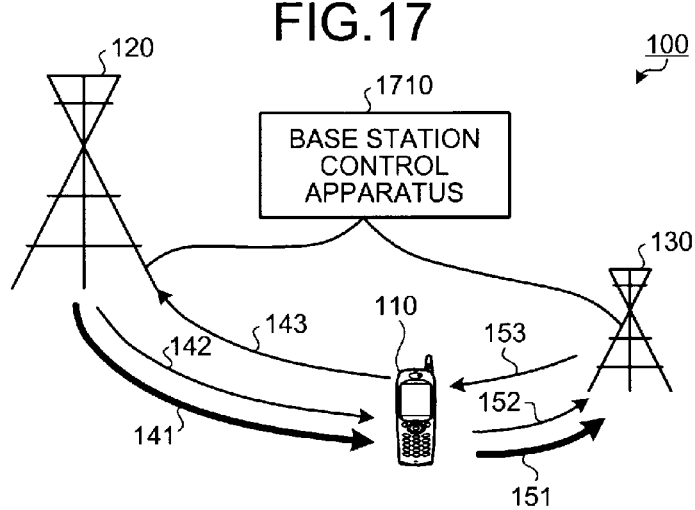
FIG. 17 is a diagram of a modified example of the communication system depicted in FIG. 1.

FIG. 17 is a diagram of a modified example of the communication system according to FIG. 1. As depicted in FIG. 17, the communication system 100 includes a base station control apparatus 1710 in addition to the configuration depicted in FIG. 1. The first base station 120 and the second base station 130 are connected to the base station control apparatus 1710 through a dedicated line. The base station control apparatus 1710 performs communication by controlling the first base station 120 and the second base station 130.

Figure 18:
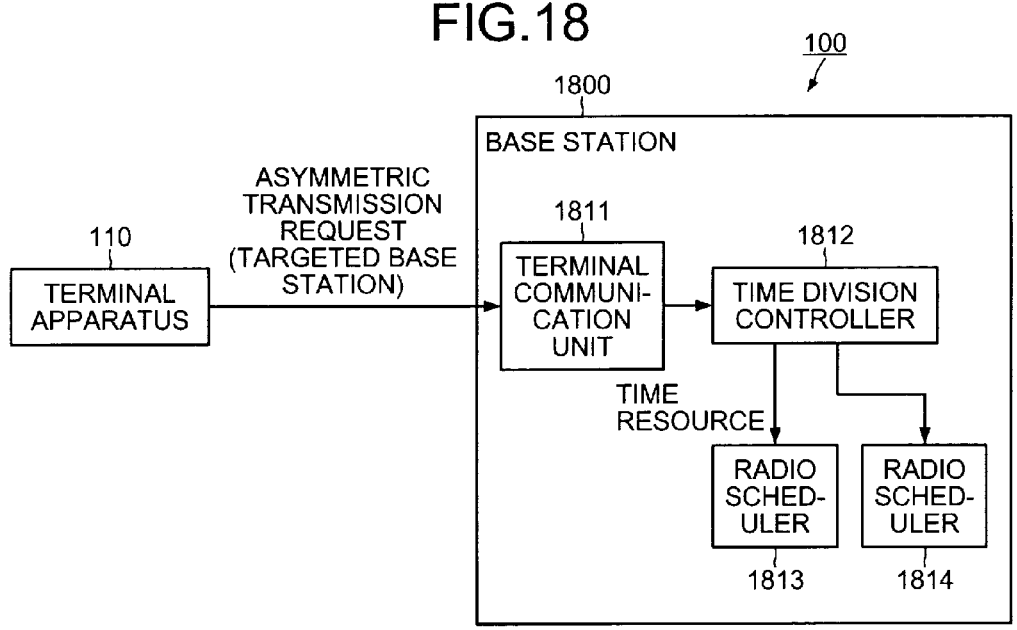
FIG. 18 is a diagram of an example of a process of the base station depicted in FIG. 17.

FIG. 18 is a diagram of an example of a process of the base station depicted in FIG. 17. A base station 1800 depicted in FIG. 18, is a base station that includes the first base station 120, the second base station 130, and the base station control apparatus 1710 depicted in FIG. 17. The base station 1800 includes a terminal communication unit 1811, a time division controller 1812, a radio scheduler 1813, and a radio scheduler 1814.

The terminal communication unit 1811 has a configuration that corresponds to the terminal communication unit 611 depicted in FIG. 6. The terminal communication unit 1811 is implemented by the first base station 120 and the second base station 130, receives the asymmetric transmission request transmitted from the terminal apparatus 110, and outputs the received asymmetric transmission request to the time division controller 1812.

The time division controller 1812 has a configuration that corresponds to the time division controller 612 depicted in FIG. 6. The time division controller 1812, based on correspondence information included in the asymmetric transmission request output from the terminal communication unit 1811, allocates time resources to the uplink and the downlink. The time division controller 1812 notifies the radio scheduler 1813 of the time resources allocated to the downlink. The time division controller 1812 further notifies the radio scheduler 1814 of the time resources allocated to the downlink.

The radio scheduler 1813 has a configuration that corresponds to the radio scheduler 613 depicted in FIG. 6. The radio scheduler 1813, by the time resources indicated by the time division controller 1812, performs scheduling of the downlink from the first base station 120 to the terminal apparatus 110. The base station 1800 performs downlink communication with the terminal apparatus 110, based on the scheduling results from the radio scheduler 1813.

The radio scheduler 1814 has a configuration that corresponds to the radio scheduler 622 depicted in FIG. 6. The radio scheduler 1814, by the time resources indicated by the time division controller 1812, performs scheduling of the uplink from the terminal apparatus 110 to the second base station 130. The base station 1800 performs uplink communication with the terminal apparatus 110, based on the scheduling result from the radio scheduler 1814.

According to disclosed terminal apparatus, communication system, and communication method, communication efficiency can be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A terminal apparatus comprising:
a downlink transceiver that receives downlink data via a base station governing a first cell and exchanges with the base station governing the first cell, control information that is for receiving the downlink data;
an uplink transceiver that transmits uplink data via a base station governing a second cell that is different from the first cell and exchanges with the base station governing the second cell, control information that is for transmitting the uplink data;
a controller that switches between communication comprising a downlink control channel, a downlink data channel, and an uplink control channel by the downlink transceiver and communication comprising a downlink control channel, an uplink data channel, and an uplink control channel by the uplink transceiver, according to time division; and
an interference power measurer configured to measure downlink interference power for each wireless frame into which wireless resources are time divided,
wherein time resources are allocated for communication with the base station governing the first cell and for communication with the base station governing the second cell, based on interference power of communication by the base station governing the first cell and interference power of communication by the base station governing the second cell.

2. A communication system comprising:
a base station that governs a first cell, transmits downlink data to a terminal apparatus and exchanges with the terminal apparatus, control information for transmitting the downlink data; and
a base station that governs a second cell that is different from the first cell, receives uplink data from the terminal apparatus, and exchanges with the terminal apparatus, control information for receiving the uplink data, wherein
the base station governing the first cell and the base station governing the second cell communicate with the terminal apparatus by time division;
the terminal apparatus comprising:
a controller that switches between communication comprising a downlink control channel, a downlink data channel, and an uplink control channel by a downlink transceiver and communication comprising a downlink control channel, an uplink data channel, and an uplink control channel by an uplink transceiver, according to time division; and
an interference power measurer configured to measure downlink interference power for each wireless frame into which wireless resources are time divided,
wherein time resources are allocated for communication with the base station governing the first cell and for communication with the base station governing the second cell, based on interference power of communication by the base station governing the first cell and interference power of communication by the base station governing the second cell.

3. The communication system according to claim 2, wherein
the terminal apparatus transmits to a base station with which the terminal apparatus is communicating, a request signal requesting reception of the downlink data via the base station governing the first cell and transmission of the uplink data via the base station governing the second cell; and
the base station with which the terminal apparatus is communicating, respectively controls based on the request signal transmitted from the terminal apparatus, the base station governing the first cell to transmit the downlink data to the terminal apparatus, and the base station governing the second cell to receive the uplink data from the terminal apparatus.

4. The communication system according to claim 2, wherein time resources are allocated for communication with the base station governing the first cell and for communication with the base station governing the second cell, based on respective amounts of traffic of the downlink data and the uplink data.

5. The communication system according to claim 2, wherein time resources are allocated for communication with the base station governing the first cell and for communication with the base station governing the second cell, based on a ratio of the respective amounts of traffic of the downlink data and the uplink data.

6. The communication system according to claim 2, wherein
the base station governing the first cell notifies the base station governing the second cell, of wireless resources allocated for control information that is received from the terminal apparatus and for transmitting the downlink data, and
the base station governing the second cell allocates for communication of the base station governing the second cell, wireless resources that are different from a time resource notified by the base station governing the first cell.

7. The communication system according to claim 2, wherein
the base station governing the second cell notifies the base station governing the first cell, of wireless resources allocated for control information that is received from the terminal apparatus and for receiving the uplink data, and
the base station governing the first cell allocates for communication of the base station governing the first cell, wireless resources that are different from a time resource notified by the base station governing the second cell.

8. The communication system according to claim 2, wherein
the terminal apparatus measures communication timing of the base station governing the first cell and communication timing of the base station governing the second cell, and
the base station governing the first cell and the base station governing the second cell allocate for communication of the base station governing the first cell and the base station governing the second cell, respectively, time resources such that a guard time that is based on the timings measured by terminal apparatus is obtained.

9. A communication method of a terminal apparatus, the communication method comprising:
measuring downlink interference power for each wireless frame into which wireless resources are time divided;
downlink communicating involving receiving downlink data via a base station governing a first cell and exchanging with the base station governing the first cell, control information that is for receiving the downlink data; and
uplink communicating involving transmitting uplink data via a base station governing a second cell that is different from the first cell and exchanging with the base station governing the second cell, control information that is for transmitting the uplink data, wherein communication is switched between a downlink transceiver receiving a downlink control information, downlink data, and uplink control information and an uplink transceiver transmitting uplink control information, uplink data and downlink control information according to time division, wherein time resources are allocated for communication with the base station governing the first cell and for communication with the base station governing the second cell, based on interference power of communication by the base station governing the first cell and interference power of communication by the base station governing the second cell.

\* \* \* \* \*